Sept. 6, 1932.  H. KLINGAMAN  1,875,465

AIRCRAFT AND AUTOMATIC CONTROL THEREFOR

Filed Aug. 17, 1931

INVENTOR
BY H. Klingaman
Frease and Bishop ATTORNEYS

Patented Sept. 6, 1932

1,875,465

UNITED STATES PATENT OFFICE

HERMAN KLINGAMAN, OF LOUISVILLE, OHIO

AIRCRAFT AND AUTOMATIC CONTROL THEREFOR

Application filed August 17, 1931. Serial No. 557,456.

My invention relates to aircraft and more particularly to airplanes including airfoils or wings having variable aerodynamic characteristics, and the present invention includes improvements of the invention set forth in my prior Letters Patent of the United States No. 1,799,910, for Airplanes, dated April 7, 1931.

In this patent I disclose an airplane including a fuselage and wings together with other usual parts of an airplane, and each wing comprising an upper airfoil and one or more lower airfoils associated with each other, whereby the outer surfaces of the upper and lower airfoils in one position constitute a composite airfoil of a usual cross-sectional contour and substantially continuous outer surfaces, and in other positions constitute a wing whose aerodynamic characteristics tend simultaneously to decelerate the horizontal and vertical velocity components of the resultant airplane velocity, and manually operated means for changing the positions of the upper and lower airfoils, whereby the speed of landing of the airplane is greatly reduced and landing becomes consequently safer.

It is generally desirable to maintain at a minimum the number of controls which it is necessary for the pilot of an aircraft to operate.

Accordingly the objects of the present invention include the provision of an aircraft including airfoils or wings having variable aerodynamic characteristics, and automatic means operable by variations in the velocity of the aircraft for actuating the variable wings so that the wings automatically vary their aerodynamic characteristics to that best suited to the particular speed of flight.

The foregoing and other objects are attained by the aircraft, apparatus, parts, improvements, and combinations, which comprise the present invention and which are particularly and distinctly pointed out and set forth in the appended claims forming part hereof.

In general terms the present improvements may be described as comprising an airplane including a fuselage, one or more sets of lifting airfoils or wings operatively associated with each other and each set constituting a composite airfoil having variable aerodynamic characteristics, and aerodynamically actuated control means operatively mounted on the fuselage and operatively connected with the lifting airfoils, whereby the aerodynamic characteristics of the airfoil are varied by variations in velocity of the airplane.

Figure 1:
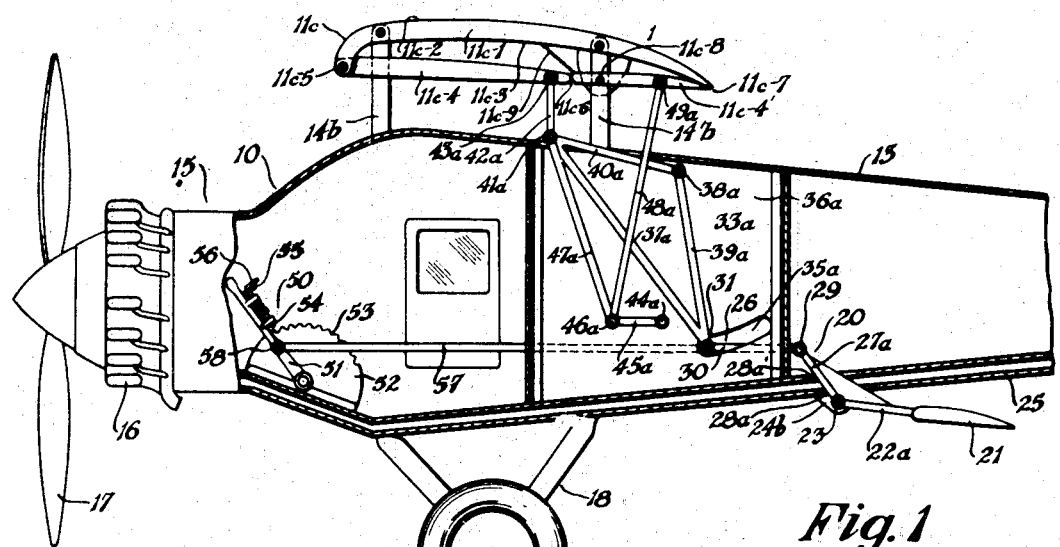
Figure 2:
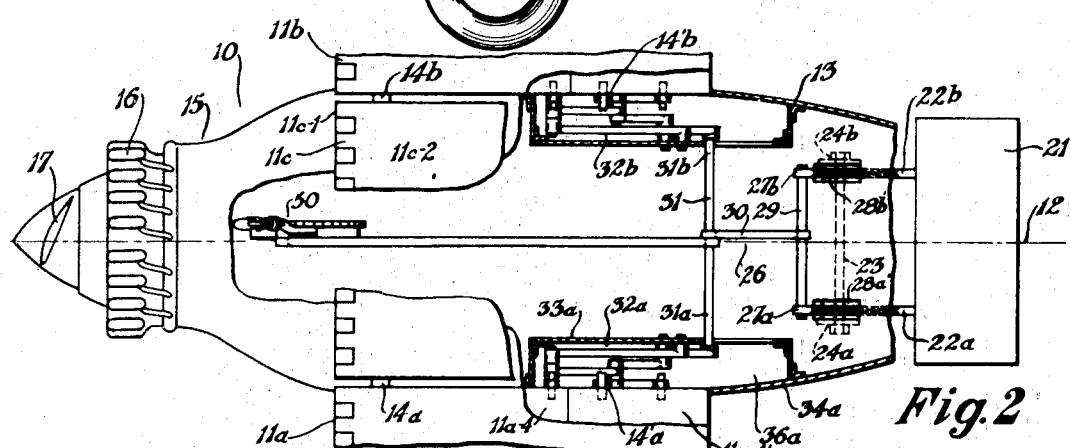

A preferred embodiment of the invention is illustrated in the accompanying drawing forming part hereof, in which Figure 1 is a fragmentary side elevation with portions in section illustrating one embodiment of the present improvements in an airplane, the several parts being in their respective positions for normal horizontal flight;

Fig. 2, a fragmentary plan view thereof; and

Figure 3:
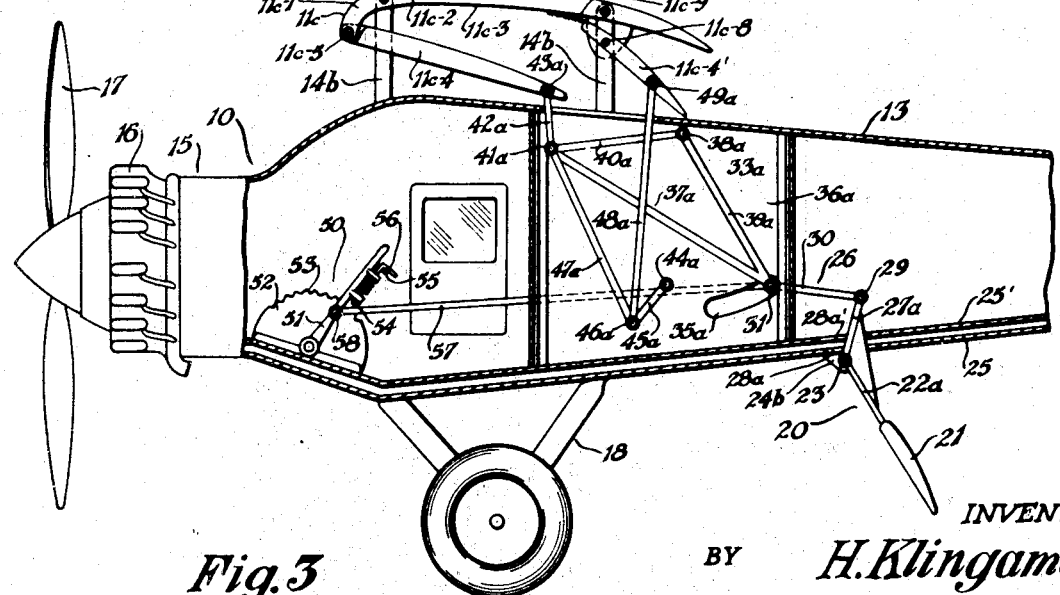

Fig. 3, a view similar to Fig. 1, illustrating the parts in their respective positions for landing.

Similar numerals refer to similar parts throughout the drawing.

One embodiment of the present improvements is included in an airplane indicated generally at 10, which, as illustrated, is a monoplane, and which includes novel main lifting wings 11a and 11b extending each from one side of the longitudinal axis 12 of the airplane, and as illustrated each from an outer end of a center wing section 11c.

A fuselage 13 is located below the wings 11a and 11b and the center wing section 11c, in the illustrated airplane 10, and the fuselage 13 is structurally connected with the wings and center wing section in a usual manner, which may include the struts 14a and 14'a extending upwardly from the fuselage 13 and interposed between one end of the center wing section 11c and the inner end of the wing 11a, and the struts 14b and 14'b extending upwardly from the fuselage 13 and interposed between the other end of the center wing section 11c and the inner end of the wing 11b.

At the forward end 15 of the fuselage 13 are located and secured in a usual manner, an engine 16, and a propeller 17, the engine and propeller being operatively associated with each other in a usual manner, and the engine being provided with usual control elements, and with a fuel and oil supply not shown, but which may be located in any usual manner within the fuselage 13, together with any usual aerodynamic control means, not shown.

The airplane 10 may furthermore include a landing gear indicated generally by 18, and secured in a usual manner below the fuselage.

The wings 11a, 11b, and the center wing section 11c, are similar in construction and arrangement, and differ only in span.

The center wing section 11c will be described in detail and includes an upper airfoil 11c—1, preferably having a convex outer surface 11c—2 and a concave inner surface 11c—3.

The upper airfoil 11c—1 is associated with one or more lower airfoils 11c—4 and 11c—4' for the purpose of providing a composite airfoil or wing having variable aerodynamic characteristics; and the leading edge of the upper airfoil 11c—1 is preferably pivotally connected as at 11c—5 with the leading edge of the forward lower airfoil 11c—4; and the leading edge of the rear lower airfoil 11c—4' is arranged in one position to contact with the trailing edge of the forward lower airfoil 11c—4 as at 11c—6, and the trailing edge of the rear lower airfoil 11c—4' in this position, preferably contacts with the trailing edge of the upper airfoil 11c—1 as at 11c—7.

The outer surfaces of the upper and lower airfoils in the wing 11c thus constitutes a composite airfoil which in one position, as illustrated in Fig. 1, has a usual cross-sectional contour and substantially continuous outer surfaces, and may have the aerodynamic characteristics of a so-called deep wing section.

For this purpose the lower surfaces of the lower airfoils 11c—4 and 11c—4' in the position indicated in Fig. 1 determine a substantially continuous lower surface substantially continuous with the upper surface of the upper airfoil 11c—1, and these outer upper and lower surfaces in this position form the contour of a so-called deep wing section.

The rear lower airfoil 11c—4' is preferably arranged to be turned about pivots 11c—8 preferably parallel with the axis of the pivotal connection between the upper airfoil 11c—1 and the forward lower airfoil 11c—4.

A strip of material 11c—9, preferably of fabric, preferably connects the forward end of the rear lower airfoil 11c—4' with the inner concave surface 11c—3 of the upper airfoil 11c—1.

Accordingly, when the lower airfoils 11c—4 and 11c—4' are positioned as illustrated in Fig. 3, so that the trailing edges of the lower airfoils are lowered below the locus of the above mentioned substantially continuous lower surface for the deep wing section formed when the upper and lower airfoils are in the position illustrated in Fig. 1, a variation takes place in the aerodynamic characteristics of the composite airfoil which the airfoils 11c—4 and 11c—4' form with the upper airfoil 11c—1.

In the positions illustrated in Fig. 3, an increase in the drag of the composite airfoil immediately occurs, and a greater resistance to falling of the wing is provided, than for the positions illustrated in Fig. 1, due to the compression of air in the concave opening formed by the lower surface of the airfoil 11c—4', the lower surface of the airfoil 11c—1, and the upper surface of the airfoil 11c—4, combined with the lift provided by the horizontal velocity of the outer surfaces of the upper airfoil 11c—1 and the lower airfoil 11c—4 relative to the air.

By these means, the speed of landing for the airplane is greatly reduced, and landings become consequently safer.

Aerodynamically actuated control means indicated generally by 20 are operatively mounted on the fuselage and are operatively connected with the center wing section 11c and the wings 11a and 11b, whereby the aerodynamic characteristics of the center wing section 11c and the wings 11a and 11b are varied by variations in velocity of the airplane 10.

The control means 20 include a laterally extending control airfoil 21 located below the fuselage and at the rear of the landing gear 18.

The control airfoil 21 is secured at the outer ends of laterally spaced arms 22a and 22b, and the inner ends of the arms 22a and 22b are secured to a laterally extending shaft 23 which is journalled in bearing brackets 24a and 24b secured to and depending below the bottom wall 25 of the fuselage 13.

Lever and link means indicated generally by 26 operatively connect the shaft 23 with the airfoils 11c—4 and 11c—4' of the center section 11c, and with the similar airfoils of the wings 11a and 11b, whereby relatively high velocity of the airplane 10 with respect to the air will lift the control airfoil 21 and rotate the shaft 23 to the elevated position illustrated in Fig. 1, and will maintain the airfoils of the center wing section 11c and the wings 11a and 11b in their relative positions for normal flight, as illustrated in Fig. 1. On the other hand, a relatively low velocity of the airplane 10 with respect to the air, permits the control airfoil 21 to drop to the position illustrated in Fig. 3, rotating the shaft 23 and moving the lower airfoils of the center wing section 11c and the wings 11a and 11b to the landing positions illustrated in Fig. 3.

As illustrated, the lever and link means 26 include laterally spaced lever arms 27a and 27b secured at their lower ends of the shaft 23 and extending upwardly therefrom, the bottom walls 25 and 25' of the fuselage having formed therein suitable sets of registering openings 28a and 28a', and 28b and 28b', and the arms 27a and 27b extending respectively through the sets of openings 28a and 28a', and 28b and 28b'.

The upper ends of the lever arms 27a and 27b are secured to the outer ends of a laterally extending cross bar 29 and the cross bar 29 has pivoted thereon the rear end of a link bar 30, and the forward end of the link bar 30 is pivoted on a laterally extending cross bar 31. The end 31a of the cross bar 31 is operatively connected with intermediate link and lever means indicated generally by 32a, and the other end 31b of the cross bar 31 is operatively connected with intermediate link and lever means indicated generally by 32b.

The link and lever means 32a and 32b are generally similar, the means 32a being operatively connected with adjacent ends of the lower airfoils of the center wing section 11c and the wing 11a, and the means 32b being similarly operatively connected with adjacent ends of the lower airfoils of the center wing section 11c and the wing 11b.

The link and lever means 32a will be described in detail, and includes a mounting plate 33a which is located within the fuselage 13, and spaced from the fuselage side wall 34a.

The plate 33a has formed therein an opening 35a, and the cross bar end 31a extends through the opening 35a into the chamber 36a between the plate 33a and the fuselage side wall 34a.

Within the chamber 36a a bell crank frame indicated generally by 37a is pivotally mounted on the plate 33a as by means of a stub shaft 38a secured to the plate and journalled in the frame. The bell crank frame 37a includes an arm 39a extending downwardly and rearwardly from the stub shaft 38a and an arm 40a extending forwardly from the stub shaft 38a.

The outer end of the rear arm 39a is pivotally connected with the cross bar end 31a, as by journalling the cross bar end in the arm, and the outer end of the forward arm 40a is pivotally connected with the lower end of a link bar 42a, as by means of a pin 41a secured to the arm and journalled in the bar. The upper end of the bar 42a extends between the adjacent ends of the lower forward airfoils 11c—4 and 11a—4 respectively of the center wing section 11c and of the wing 11a; and the upper end of the bar 42a is pivotally connected with the rear ends of the airfoils 11c—4 and 11a—4, as by means of a pin 43a journalled in the bar 42a and having its outer ends secured respectively in the adjacent lower airfoils 11c—4 and 11a—4.

A stub shaft 44a is secured in the plate 33a within the chamber 36a and pivotally mounts one end of a rock arm 45a journalled on the shaft. The outer end of the rock arm 45a is pivotally connected with one end of a link bar 47a, as by means of a pin 46a secured on the rock arm and journalled in the bar. The other end of the link bar 47a is pivotally connected with the pivotally connected ends of the arm 40a and the link bar 42a, as by journalling the bar 47a on the pin 41a.

The pin 46a is also pivotally connected with the lower end of a link bar 48a, as by journalling the bar on the pin. The upper end of the bar 48a extends at the rear of the pivot 11c—8 and between the adjacent ends of the rear lower airfoil 11c—4' of the center wing section 11c and the rear lower airfoil 11a—4' of the wing 11a, and the bar 48a is pivotally connected therewith, as by means of a pin 49a journalled in the bar 48a and having its ends secured in the opposite ends of the airfoils 11c—4' and 11a—4'.

By the foregoing construction and arrangement, automatic variations in the aerodynamic characteristics of the center wing section 11c and the wings 11a and 11b are attained.

Manual control means indicated generally by 50 may be provided therefor, and may include a lever 51 pivotally mounted at its lower end on a toothed sector plate 52 which is secured at the forward end of the interior of the fuselage 13. The sector plate 52 may have formed therein a plurality of teeth 53 which may be engaged by the lower end of a spring pressed plunger 54 slidably mounted on the lever 51.

Normally, however, the spring pressed plunger 54 is maintained in a position displaced from the teeth 53 of the sector plate 52, as by means of a stop arm 55 secured on the lever 51 and engaging a catch arm 56 extending outwardly from the plunger 54, the engagement being made after the plunger 54 has been withdrawn to the displaced position.

The lever 51 is pivotally connected with the forward end of a link bar 57, as by means of a pin 58 secured in the lever 51 and journalled in the bar 57, and the other end of the link bar 57 is pivotally connected with the cross bar 31, as by journalling the bar 57 thereon.

I claim:

1. An airplane including a fuselage, a set of lifting airfoils mounted on the fuselage and operatively associated with each other and constituting a composite airfoil having variable aerodynamic characteristics, aerodynamically actuated control means operatively mounted on the fuselage, the control means including a control airfoil located below the fuselage, and means operatively connecting the control means with the set of lifting airfoils.

2. An airplane including a fuselage, a set of lifting airfoils mounted on the fuselage and movably associated with each other and constituting a composite airfoil having variable aerodynamic characteristics, aerodynamically actuated control means operatively mounted on the fuselage, the control means including a control airfoil located and movable below the fuselage, and means operatively connecting the control means with the set of lifting airfoils.

3. An airplane including a longitudinally extending fuselage, a laterally extending main lifting wing mounted on the fuselage, an airfoil movably associated with the main lifting wing for varying the aerodynamic characteristics thereof by movement of the airfoil, aerodynamically actuated control means operatively mounted on the fuselage at the rear of the main lifting wing, and means operatively connecting the control means with the movable airfoil.

In testimony that I claim the above, I have hereunto subscribed my name.

HERMAN KLINGAMAN.